United States Patent [19]

Hayner

[11] 4,069,702
[45] Jan. 24, 1978

[54] METHOD AND APPARATUS FOR TESTING THE RUN-OUT AND RECOIL CONTROL SYSTEMS OF A GUN

[75] Inventor: Paul F. Hayner, Gilford, N.H.

[73] Assignee: Sanders Associates, Inc., Nashua, N.H.

[21] Appl. No.: 765,715

[22] Filed: Feb. 4, 1977

[51] Int. Cl.² .................................... G01M 19/00
[52] U.S. Cl. ............................. 73/11; 73/167; 73/168; 73/432 SD
[58] Field of Search ............ 73/167, 432 SD, 11, 73/12, 168

[56] References Cited

U.S. PATENT DOCUMENTS

| | | | |
|---|---|---|---|
| 3,062,036 | 11/1962 | York | 73/12 |
| 3,098,382 | 7/1963 | Hoffman et al. | 73/168 |
| 3,597,969 | 8/1971 | Curchack | 73/167 |
| 3,693,432 | 9/1972 | Stewart et al. | 73/167 |
| 4,038,869 | 8/1977 | Curchack | 73/167 |

*Primary Examiner*—Richard C. Queisser
*Assistant Examiner*—Joseph W. Roskos
*Attorney, Agent, or Firm*—Louis Etlinger; Robert K. Tendler

[57] ABSTRACT

A method and apparatus for testing and evaluating the runout and recoil control systems for a gun in which a body having a mass representative of the mass of the moving parts of the gun is accelerated under the control of the runout system under test and then decelerated under the control of the recoil control system under test. During both acceleration and deceleration various conditions such as the position and velocity of the body are measured and recorded.

26 Claims, 16 Drawing Figures

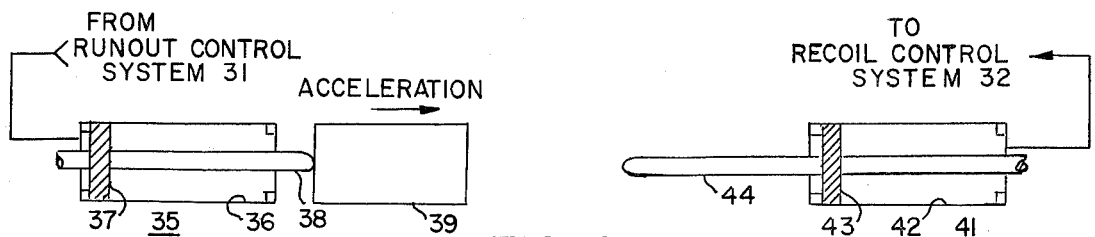
FIG. 6.
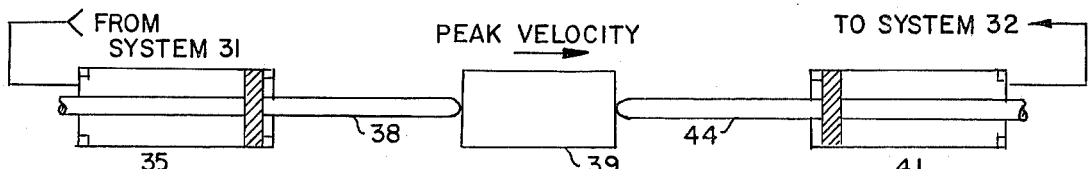
FIG. 7.
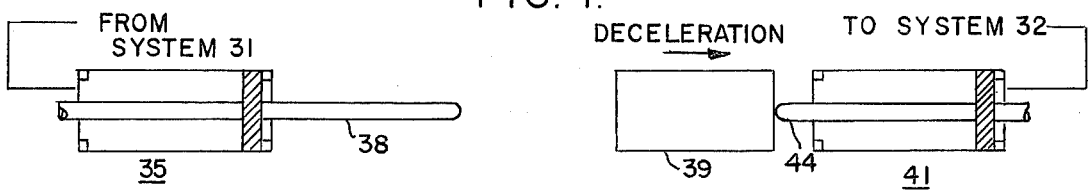
FIG. 8.
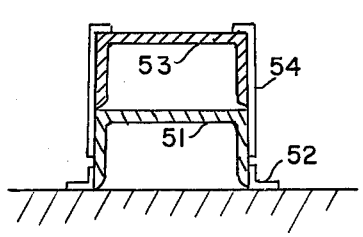
FIG. 10.
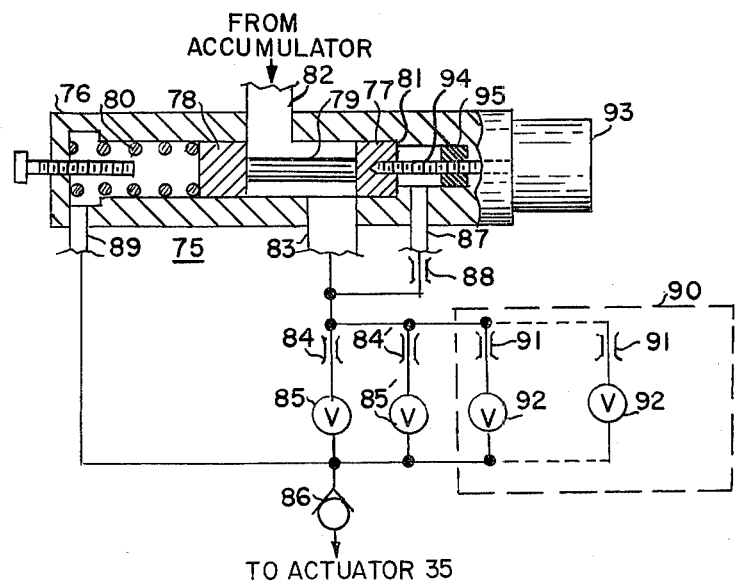
FIG. 11.
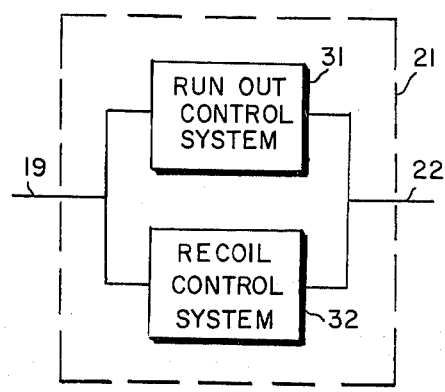
FIG. 4.
FIG. 5.

METHOD AND APPARATUS FOR TESTING THE RUN-OUT AND RECOIL CONTROL SYSTEMS OF A GUN

FIELD OF THE INVENTION

This invention relates generally to systems for controlling the runout and recoil or artillery and particularly to methods and apparatus for simulating the conditions existing prior to and after firing a gun so the control systems can be tested and evaluated without firing the gun.

BACKGROUND OF THE INVENTION

Artillery, or large caliber guns of the kind of interest for present purposes are, in general, guns larger than those intended to be transported and operated by one man. Such guns, in general, include a carriage or frame, which enables the azimuth and elevation to be adjusted and which, during firing, is held stationary. Normally, the barrel of the gun is mounted for limited axial movement relative to the frame, so that, upon firing, the gun recoils and moves backward relative to the frame. Before the gun can be fired again, the backward movement must be stopped, the gun must be reloaded and the barrel returned to its forward, firing position. The firing of the gun releases a great deal of energy some of which inevitably appears as the kinetic energy of the rearward motion, or recoil, of the gun barrel. In order to stop such rearward motion, this energy must be dissipated and/or stored and/or utilized, and equipment for these purposes is normally provided. Such equipment may vary widely in kind and in complexity. One arrangement includes a pair of hydraulic cylinders and pistons with one element of each pair, for example, the cylinders, fastened on opposite sides of the gun barrel and with the other element of each pair fastened to the frame. Hydraulic circuitry connects the cylinder to an accumulator so that, during recoil, fluid from the cylinders flows to the accumulator thereby storing the energy of recoil. This recoil equipment may be supplemented by snubbers such as springs, rubber bumpers, dashpots and the like. The stored energy may be used to reload the gun and/or to return it to its firing position.

Equipment such as that briefly described above has been widely used but has been subject to a number of limitations and disadvantages. Recently there has been considerable activity in the design of improved equipment to overcome these limitations and disadvantages. However, the testing of such newly designed equipment presents numerous difficulties. A runout and recoil control system may, of course, be tested for the first time by installing the system on the gun and then firing the gun but such a procedure is not attractive. For one thing, there are usually severe restrictions regarding the time, the places and the conditions under which the gun may be fired. Compliance with the conditions is often time consuming and expensive. Furthermore, reliance on a previously untested system to control recoil raises serious questions as to the safety of both personnel and equipment.

It is a general object of the present invention to provide an improved method and apparatus for testing and evaluating systems and equipment for controlling the runout and/or recoil of a gun.

SUMMARY OF THE INVENTION

Briefly stated, the invention includes the concept of accelerating a body having a mass representative of the mass of the moving parts of the gun to a predetermined velocity, then decelerating the body under the control of the recoil control system under test, and measuring and recording the position of the body as a function of time.

BRIEF DESCRIPTION OF THE DRAWING

For a clearer understanding of the invention, reference may be made to the following detailed description and the accompanying drawing in which:

FIG. 4 is a block diagram showing how the runout and recoil control systems are connected to the gun;

FIG. 5 is a block diagram showing how the runout and recoil control systems are connected to the simulator of this invention;

FIGS. 6, 7 and 8 are schematic diagrams illustrating the basic principles of the invention;

FIG. 10 is a schematic cross section view taken on the line 10 — 10 of FIG. 9;

FIG. 11 is a schematic diagram of a portion of a runout control system with modifications made to facilitate test and evaluation thereof;

DESCRIPTION OF PREFERRED EMBODIMENT

Figure 1:
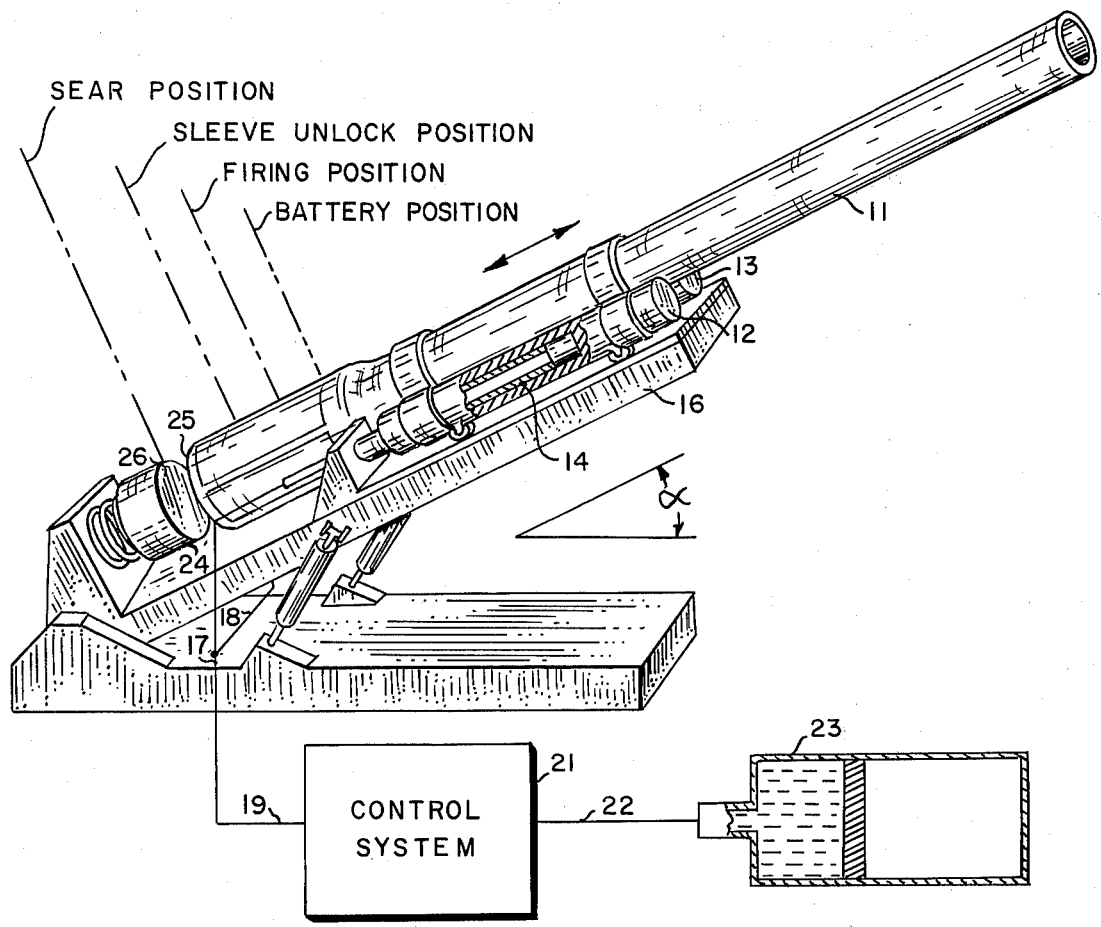
FIG. 1 is a schematic diagram with portions in block form showing the relationship among the gun barrel, the recoil pistons and cylinders, the control system, and the accumulator.

Referring first to FIG. 1, there is shown a gun barrel 11 assumed to be adjusted to some arbitrary angle, α, above the horizontal. Two recoil cylinders, 12 and 13, are rigidly fastened to the gun barrel 11 on opposite sides thereof. Associated with each cylinder is a piston, one of which, the piston 14, is shown within the cylinder 12. Both pistons are fastened rigidly to the frame 16 of the gun. Hydraulic lines 17 and 18 communicate with the interior of the cylinders 12 and 13 respectively. These lines are connected together and to a line 19 which in turn is connected to a hydraulic control system 21. This control system, in turn, is connected by a hydraulic line 22 to an accumulator 23.

The gun barrel 11 and the cylinders 12 and 13 are mounted to be moveable relative to the frame 16 along a line parallel to the axis of the gun barrel 11. Cylinders 12 and 13 and all of the hydraulic lines are filled with fluid so that if the gun barrel 11 moves rearwardly, which is downward and to the left as viewed in FIG. 1, fluid will be expelled from the cylinders 12 and 13 through the hydraulic lines 17, 18 and 19 to the control system 21 and then through the hydraulic line 22 to the accumulator 23. Conversely, if fluid is forced through these hydraulic lines into cylinders 12 and 13, the gun barrel 11 will be urged forward, that is, upward and to the right, as viewed in FIG. 1. When the gun barrel 11 moves rearward further than the position shown in FIG. 1 (as it will during recoil), it engages a snubbing mechanism 24, illustrated in block form since the details thereof are not a part of the present invention. It may include springs, dashpots, resilient materials and the like, all as well known in the art. The mechanism 24 arrests the remaining rearward motion and returns the barrel 11 to a position with its end 25 substantially flush with the top 26 of the mechanism 24. This position is designated the sear position. Other positions of the barrel 11 are designated the sleeve unlock position, the firing position, and the battery position, the significance of which will be more fully explained subsequently. The gun barrel 11 is illustrated in FIG. 1 in a position intermediate the sleeve unlock position and the sear position.

Figure 2:
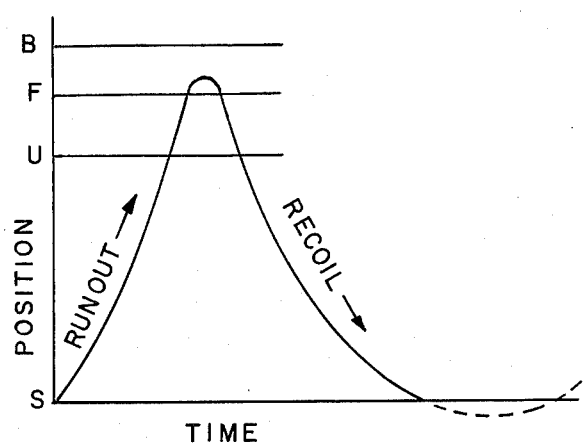
FIGS. 2 and 3 are each graphs useful in explaining the invention.

Referring now to FIG. 2, there is shown schematically a typical firing cycle of the gun. The cycle is shown starting at the sear position S, that is, with the end 25 of the gun barrel just at the top 26 of the snubber 24, and with a small initial forward velocity. It is assumed that the gun has been loaded with ammunition. The gun is advanced by admitting fluid to the cylinders 12 and 13 until it reaches the firing position, F. Ideally, the gun barrel should be accelerated to a predetermined velocity which is held constant until it reaches the firing position. At this position, it is fired automatically, for example, by means of a switch actuated by the gun barrel when it reaches the desired firing position. Firing of the gun rapidly reverses the direction of travel of the gun barrel which recoils through the firing position and through a sleeve unlock position, U, where the sleeve is unlocked so that the gun may be reloaded. The gun continues to recoil and preferably reaches the sear position with another predetermined velocity. At this position it engages the snubber 24 which absorbs the remaining recoil motion, reverses the direction and returns the gun to the sear position. While at or near the sear position, the gun is reloaded either manually or automatically. If the rearward velocity when it reaches the sear position is too low, the barrel may have insufficient momentum to operate any associated reloading mechanism. If the velocity is too high, it may damage that mechanism and/or the snubbing mechanism 24.

Figure 3:
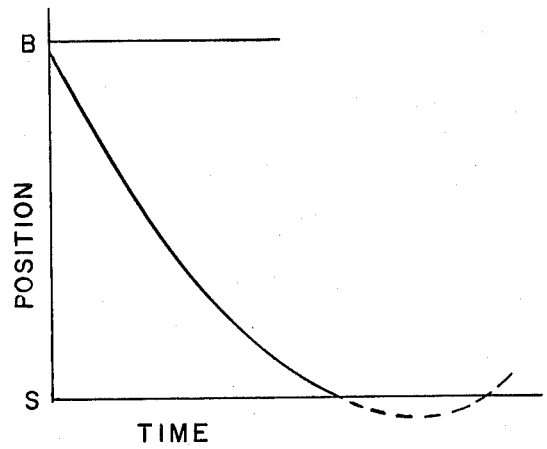

It is sometimes desired to fire the gun from battery position, that is, to fire it while it is stationary but located at a position somewhat forward of the firing position at which it is fixed from runout. FIG. 3 shows a typical curve of the position of the gun as a function of time when it is fired from battery position, B. The initial recoil velocity is, of course, higher than if the gun had a forward velocity when fired, and this difference must be taken into account in the design of the control system 21. As in the case of firing from runout, when firing from battery, the flow of fluid from the cylinders to the accumulator should be controlled so that the velocity of the barrel when it reaches the sear position will be within predetermined limits.

The control system 21 may take various forms. Typically, as shown in FIG. 4, it comprises a runout control system 31 and a recoil control system 32, each connected through the line 19 to the gun cylinders 12 and 13 and through the line 22 to the accumulator 23. The former controls the flow of fluid from the accumulator to the gun cylinders 12 and 13 during runout, or advance, of the gun. The recoil control system controls the flow of fluid from the cylinders 12 and 13 to the accumulator 23 during recoil. These systems are not entirely independent of each other. The magnitude of the forward velocity, established by the runout control system, at the moment of firing will, other things being equal, affect the recoil or rearward velocity at the sear position. It is usually desireable that the latter velocity be the same, within certain limits, at all times. However, other factors also affect this velocity and these factors themselves are variable. For example, as previously noted, it is sometimes desireable to fire from runout, when there is a forward velocity, and it is sometimes desired to fire from battery, when the gun barrel is stationary. Obviously, the maximum recoil velocity in the two cases is different. Additionally, the gun may be fired from different elevations with the result that the force of gravity has a different influence. Another factor is that it may be desired to use either high explosive (HE) ammunition or armor piercing (AP) ammunition which generate different recoil pressures and different peak recoil velocities. Furthermore, the ammunition as received from the factory is far from uniform and the wide permitted tolerance causes the pressure (and velocities) generated by different rounds of the same type to vary considerably. These varying conditions, and runout and recoil control systems capable of coping with them, are fully described in the co-pending application of Paul F. Hayner, entitled Method & Apparatus for Controlling & Utilizing Recoil, Ser. No. 765,706, filed Feb. 4, 1977 which application is assigned to the same assignee as is the instant application. Briefly stated, that application describes a runout control system which controls the rate of flow of fluid to the gun cylinders during runout (and consequently controls the velocity of the barrel) by establishing and maintaining a predetermined pressure drop across a selected one or more of a plurality of orifices. The recoil control system measures the peak recoil velocity and the elevation angle and computes and establishes that constant deceleration necessary to reduce the velocity of the gun barrel to the desired value by the time it reaches the sear position.

As shown in FIG. 5, the simulator of the present invention indicated generally by the reference character 33, is connected to the runout control system 31 and to the recoil control system 32 in place of the actual gun and its accumulator. The apparatus 33 faithfully simulates the conditions which would be "seen" by the control systems 31 and 32 during actual firing of the gun. As will be more fully explained, the simulator 33 is capable of simulating a variety of conditions such as those which might arise through selection of various types of ammunition and various angles of elevation.

The principles of operation of the invention are shown in FIGS. 6, 7 and 8. A hydraulic actuator 35 comprises a cylinder 36, a piston 37 and a piston rod 38. Either the cylinder or the assembly comprising the piston and the piston rod may remain stationary during normal operation while the other moves. For present purposes, it will be assumed that the cylinder 36 is stationary while the piston 37 and piston rod 38 constitute the moveable element. As shown in FIG. 6, the piston 37 is initially in its retracted position, that is, all the way to the left as viewed in FIG. 6, and while in this position a body 39 having a mass representative of the mass of the moving parts of the gun is placed in engagement with the moveable element 38. The left end of the cylinder 36 is hydraulically connected to the runout control system 31. To start the operations, fluid from the system 31 is passed to the cylinder 36 whereupon the body 39 is accelerated, preferably to a predetermined constant velocity. During this operation, many measurements can be made and recorded, the most important being the position of the body 39 as a function of time. In this way it can be seen whether the system 31 is functioning properly.

To the right, as viewed in FIG. 6, there is another hydraulic actuator 41 similar to the actuator 35 and including a cylinder 42 constituting a stationary element and a piston 43 and piston rod 44 constituting a moveable element. The right end of the cylinder 42 is hydraulically connected to the recoil control system 32. Initially, the piston 43 is all the way to the left, as shown in FIG. 6, with the piston rod 44 extending along the prospective path of movement of the body 39.

By the time the piston rod 38 of the actuator 35 is fully extended, the body 39 will have reached its peak velocity and, at about this time or slightly thereafter, the body 39 will engage the moveable element 44 of the actuator 41. Such engagement simulates the impulse which would occur upon firing of the gun. However, instead of reversing the direction of the body, the action of recoil is simulated by simply decelerating the already moving body. As the moveable element 44 is pushed to the right by the body, fluid is expelled from the cylinder 42 and flows to the recoil control system 32 which so controls the flow of fluid as to bring the body to rest at or before the time the moveable element is fully retracted as shown in FIG. 8. During this deceleration time, the position of the body as a function of time continues to be recorded thereby giving an indication of the operation of the recoil control system 32. As will be more fully explained, it is preferred that a number of additional conditions also be measured and recorded.

Figure 9:
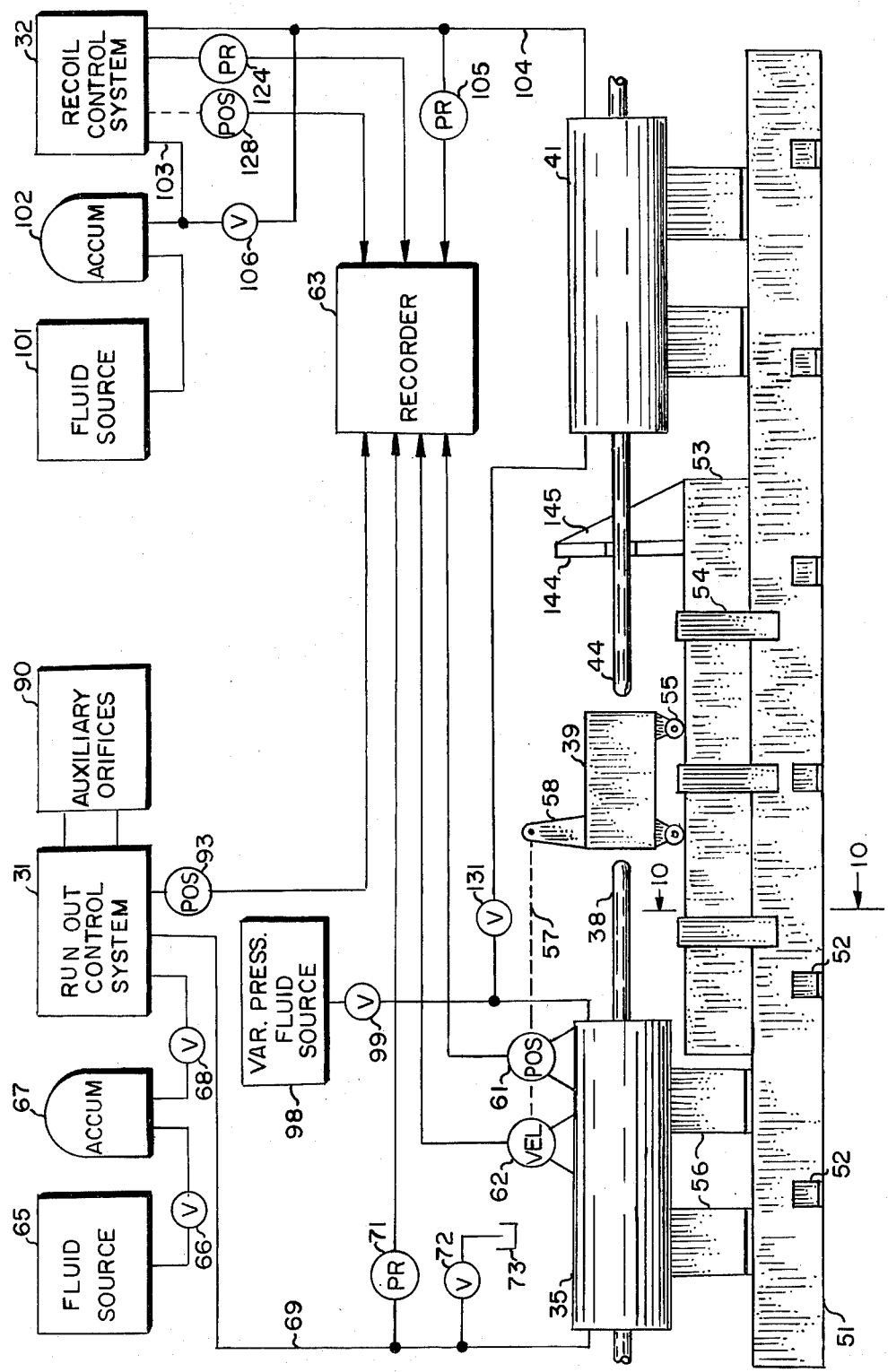
FIG. 9 is a schematic diagram of apparatus for practicing the invention.

Referring now to FIG. 9, there is shown a base channel 51 which is fastened to the floor by means of a plurality of angle brackets 52. Another channel iron 53 is placed on top of the channel 51 and held in place by a plurality of guide blocks 54, as best shown in FIG. 10. The body 39, representative of the mass of the moving parts of the gun, is mounted on four rollers 55 and placed on top of the channel 53 so as to roll lengthwise therealong. To the left of the channel 53 the actuator 35 is mounted by means of brackets 56 to the channel 51. A flexible cable 57 is fastened to the body 39, for example by means of an upstanding bracket 58, and extends to a position transducer 61 and a velocity transducer 62. These transducers are mounted at any convenient stationary location, shown, for example, as being on top of the case of the actuator 35. One kind which has been found satisfactory is commercially obtainable from Celesco Transducer Products, Inc., of Orange Park, Calif., as their Model No. DV-303-60A, Spec. 60. This component contains both the position transducer and the velocity transducer in a single housing. Each of these transducers generates an electric signal, the transducer 61 generating a signal indicative of the linear position of the body 39 while the transducer 62 generates a signal indicative of its linear velocity. These signals are led to a recorder 63. The recorder 63 preferably is one which can accept several signals simultaneously and record the magnitude of each as a function of time, preferably upon paper of some kind which can be removed for later examination. Such recorders are well known and one which has found suitable is known as a Visicorder Oscillograph Model 1508B and is available from the Test Instruments Division of Honeywell in Denver, Col.

A source 65 of fluid under pressure is hydraulically connected through an on-off valve 66 to an accumulator 67 where a supply of such fluid is stored. The accumulator in turn is connected through an on-off valve 68 to the runout control system 31. This system is also hydraulically connected through the line 69 to the left end of the actuator 35. A pressure transducer 71 is hydraulically connected to the line 69 and generates an electric signal indicative of the pressure in this line. This electric signal is led to the recorder 63. The transducer 71 may, for example, be one which is commercially available from BLH Electronics, of Waltham, Mass., as their DHF Pressure Transducer Part No. 402469. An on-off valve 72 connects the hydraulic line 69 to the reservoir or tank 73 for a purpose which will appear subsequently.

A typical runout control system can establish one or more predetermined rates of fluid flow in its output, each of which corresponds to a predetermined velocity of the gun barrel. For example, as previously noted, for different types of ammunition different velocities are required when the gun barrel reaches firing position. In most cases, two velocities will probably be sufficient. However, for testing purposes, many more different velocities may be required. For example, different velocities of the body 39 are required for testing runout and recoil and for each such test different velocities are required for each different type of ammunition. In addition for each type of ammunition it is highly desireable to be able to establish velocities corresponding to the upper and lower tolerance limits. Accordingly, for the purposes of the present invention, it is preferred to have available a runout system which is capable of establishing many different velocities. A satisfactory system can be obtained by a small addition to the runout system described in the aforementioned co-pending application Ser. No. 765,706.

Referring now to FIG. 11 there are shown the essential features of the runout system described in the aforementioned co-pending application. This system comprises principally a flow control valve indicated generally by the reference character 75 and including a body 76 having a hollow interior cylinder in which there is a movable spool comprising a land 77 and a land 78 joined by a rod 79. The right end of the valve is provided with one or more stops such as the shoulder portion 81 formed in the body and which limits the movement of the spool to the right to the position shown in FIG. 11. The body is formed with a port 82 just to the right of the land 78 which port is hydraulically connected through the valve 68 (FIG. 9) to the accumulator 67. There is also a port 83 formed in the body 76 just to the left of the land 77 which is hydraulically connected through a principal restrictor 84, an on-off valve 85 and a check valve 86 to the actuator 35. Another restrictor 84' and another valve 85' are connected in series with each other and in parallel with the restrictor 84 and valve 85. Another port 87 communicates with the end space to the right of the land 77 and this port is connected through a restrictor 88 to the port 83. Another port 89 communicates with the left end space and is hydraulically connected to the junction between the valves 85 and 86.

In parallel with the series combination of restrictors 84, 84' and valves 85, 85' there are several additional similar pairs, indicated collectively by the reference character 90, and each comprising a restrictor 91 in series with an on-off valve 92. In the runout system of application Ser. No. 765,706 the two restrictors 84 and 84' are sufficient, one for High Explosive and one for Armor Piercing ammunition. In the present case, for purposes of testing both runout and recoil control systems it is preferred that there be many orifices so that any one of many different velocities may be selected.

One more modification to the runout control system of application Ser. No. 765,706 has been made and that is the addition of a position transducer 93 mounted on the right end of the valve body 76 and mechanically connected to a rod 94 which is threaded into the land 77. A fluid seal schematically indicated at 95 (which could be a simple O-ring) surrounds the rod 94. The transducer 93 is one which generates an electric signal which is a linear function of the longitudinal position of the rod 94. This signal is led to the recorder 63. The transducer 93 may, for example, be one which is commercially available from Trans-Tek, Incorporated, Route 83, Ellington, Conn., as their Model No. 241-000, C-6.

To describe the operation of the runout control system shown in FIG. 11 let us first assume that the valve 85 is open but that the valve 85' and all of the valves 92 are closed so that the only orifice in the circuit is the orifice 84. Initially, the valve 75 is wide open so that when flow starts from the accumulator 67 to the actuator 35 there is a large pressure drop across the orifice 84. The up-stream pressure is connected to the right end space while the down-stream pressure is connected to the left end space. Since the up-stream pressure is higher, the valve is urged to the left. This reduces the flow through the valve thereby reducing the pressure drop and the valve is soon stabilized at a position determined by the pressure drop across the orifice 84 and the constant of the spring 80, all in a well-known manner. The spring constant and the size of the orifice are selected so that the pressure drop corresponds to a predetermined desired rate of flow through the valve and to the actuator which in turn corresponds to a predetermined desired velocity of the actuator. Changing the size of the orifice changes the rate of flow required to establish the predetermined pressure drop. By selecting the proper orifice or combination of orifices any of many different predetermined velocities can be established. During this operation, the position transducer 93 continuously monitors the position of the valve 75.

Referring again to FIG. 9, a variable pressure fluid source 98 is hydraulically connected through an on-off valve 99 to the right end of the actuator 35. This pressure source exerts a back pressure on the actuator 35 so as to simulate the force of gravity acting on the gun barrel 11 when elevated above the horizontal.

Another fluid source 101 having a pressure substantially greater than that of the source 65 is hydraulically connected to another accumulator 102 which in turn is hydraulically connected through a conduit 103 to the recoil control system 32. This system in turn is hydraulically connected through a conduit 104 to the right end of the actuator 41. A pressure transducer 105, similar to the transducer 71 is also hydraulically connected to the right end of the actuator 41 and the signal generated by the transducer is led to the recorder 63. An on-off valve 106 is hydraulically connected between the conduits 103 and 104 for a purpose which will appear subsequently.

Figure 12:
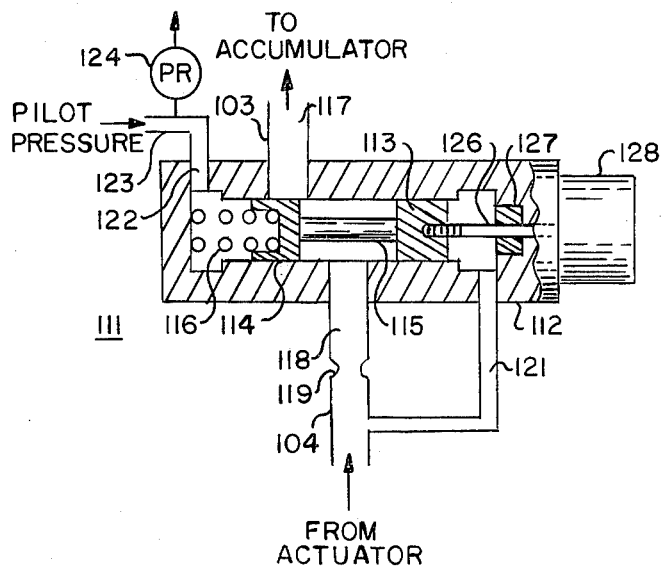
FIG. 12 is a schematic diagram of a portion of a recoil control system with modifications made to facilitate test and evaluation thereof.

A portion of a recoil control system, such as that described in the aforesaid co-pending application Ser. No. 765,706 is illustrated in FIG. 12. This system controls the pressure in conduit 104 during deceleration of the body 39 so as to reduce the velocity of the body to a predetermined value by the time it has reached a predetermined position. This velocity is analogous to the velocity of the gun barrel when it reaches the sear position.

More particularly, the portion of the system shown in FIG. 12 comprises a valve indicated generally by the reference character 111 including a valve body 112 formed with a hollow cylinder within which there is a valve spool comprising lands 113 and 114 joined by a shaft 115. A spring 116 in the left end space urges the valve spool toward the right as viewed in the FIG. 12. A port 117, shown as partially closed by the land 114, is connected to the conduit 103. A port 118, between the lands 113 and 114, is connected through an orifice 119 to the conduit 104. A port 121 communicates with the right end space and is connected to the conduit 104. A port 122 communicates with the left end space and is connected to a conduit 123 which receives a control fluid at a pilot pressure which pressure is established by the remainder of the recoil system (not shown), and is the pressure which it is desired to maintain in the conduit 104 and the actuator 41 so as to decelerate the body 39 to the proper velocity by the time it has reached a predetermined position.

In operation, the pressure of the actuator 41 which appears in the conduit 104 is applied to the right end space of the valve while the pilot pressure is applied to the left end space of the valve. The spring 116 is a very weak spring and, for most purposes, can be ignored when it is compared to the pressures in conduits 104 and 123. If the pressure in conduit 104 exceeds that in conduit 123, the spool will be urged to the left thereby opening the valve wider and reducing the pressure in conduit 104. If less, the spool will be urged to the right, closing the valve further. The position of the valve is soon stabilized with the pressure in the conduit 104 equal to the pilot pressure in the conduit 123. During operation, the pressure in the conduit 104 is measured and recorded by the previously mentioned transducer 105 (FIG. 9). It is also useful to measure and record the pilot pressure in conduit 123 and for this purpose a transducer 124 similar to the transducer 71 is hydraulically connected to the conduit 123 and the signal generated thereby is led to the recorder 63.

It is also useful, for the purposes of evaluation, to measure and record the physical position of the spool of the valve 111. A rod 126 is threaded into the right end of the land 113 and passes through the right end space and through a fluid seal shown schematically at 127 to a position transducer 128 mounted on the valve body 112. This transducer may be similar to the transducer 93 and generates a signal indicative of the axial position of the spool of the valve 111 which signal is transmitted to the recorder 63.

OPERATION

In order to test the runout control system, the valve 66 is opened so as to charge the accumulator. The body 39 is shifted all the way to the left as viewed in FIG. 9, so that the moveable element 38 of the actuator 35 is fully retracted. The moveable element 44 of the actuator 41 is also shifted all the way to the left which is the position shown in FIG. 9. The orifice or combination of orifices 84, 84', 91 (FIG. 11) is then selected in accordance with the type of ammunition whose firing is to be simulated. The variable pressure source 98 is adjusted and the valve 99 is opened so as to apply a back pressure to the actuator 35 in accordance with the gun elevation which is to be simulated. The valves 72 and 106 are closed. An on-off valve 131, which interconnects the right side of actuator 35 with the left side of actuator 41 is opened. Finally, the starting valve 68 is opened whereupon fluid flows from the accumulator 67 through the runout control system 31 to the left side of the actuator 35. The moveable element 38 extends, accelerating the body 39. The fluid expelled from the right side of the actuator 35 flows through the source 98 to the reservoir or tank, rather than to the actuator 41 because the pressure of the source 101 and the pressure applied to the right side of the actuator 41 is substantially greater than the pressure of the source 98. The transducers 61, 62, 71 and 93 record the position of the body 39, the velocity of the body, the pressure in the actuator 35, and the position of the valve in the runout control system on the recorder 63. When the moveable element 38 is fully extended, the body 39 will have reached its maximum and controlled runout velocity and the test of the runout control system is finished. There is preferably a short distance between the position at which the body 39 becomes disengaged from the moveable element 38 and the position at which it engages the moveable element 44. However, it soon engages the element 44 which causes fluid to be expelled from the actuator 41 and forced through the recoil control system to the accumulator 102 thereby bringing the body to a stop. Since it is unlikely that the velocity of the body 39 when testing the runout system would be the same as that desired to test the recoil system, the readings of the transducers 105, 124 and 128 will probably be of little interest during this test.

When it is desired to run another test, the moveable elements 44 and 38 and the body 39 are again moved all the way to the left. This may be done by closing valves 68 and 99 and opening valves 106 and 72. Valve 131 is left open. Very little fluid need flow through valve 106 to move the elements 44 and 38 to the left and at the same time move the body 39 at least to the position shown in FIG. 9. The body has very little rolling friction and can easily be moved by hand into engagement with the retracted moveable element 38.

In order to test the recoil control system the valves 106, 99 and 72 are closed and the proper one or more of the valves 85, 85' and 92 (FIG. 11) are opened to select the correct size of orifice to establish the desired velocity of the body 39 so as to simulate the peak recoil velocity of the gun. Then the valve 68 is opened whereupon the actuator 35 extends the moveable element 38 thereby accelerating the body 39 to a velocity simulating the peak recoil velocity. The body 39 leaves the moveable element 38 and engages the moveable element 44 thereby expelling fluid from the actuator 41 through the conduit 104 to the recoil control system 32, the conduit 103 and the accumulator 102. As this is occurring, all of the various transducers are sending their signals to the recorder 63 which records them thereby providing an indication of the operation of the recoil control system 32.

Figure 13:
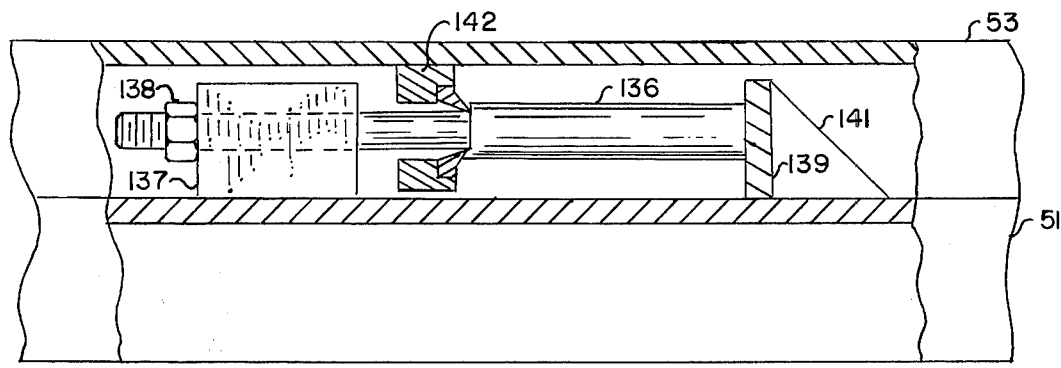
FIG. 13 is a fragmentary cross section view of a portion of the apparatus of FIG. 9 showing the elements of a safety device.

A safety device is provided in case a malfunction of the actuator 41 or the recoil control system 32 should fail to stop the forward motion of the body 39. As shown in FIG. 13, a steel rod 136 has an enlarged diameter on the right end as shown in FIG. 13 but is machined to a smaller diameter on its left end which also is partially threaded. This rod passes through an aperture in a block 137 which is rigidly fastened to the upper surface of the lower channel 51. A nut 138 holds the rod 136 against movement to the right. It is assisted by an upstanding block 139 also rigidly fastened to the upper surface of the lower channel 51 and which is braced by means of an angle bracket 141 fastened to both the block 139 and the channel 51. A hollow circular cutting tool 142 fits around the left or reduced diameter portion of the shaft 136 and the tool engages the beginning of the enlarged portion as shown. The tool 142 is rigidly fastened to the underside of the upper channel member 53.

Referring back to FIG. 9, there is shown an upstanding bracket 144 rigidly fastened to the upper surface of the upper channel member 53 and formed with a central aperture through which the moveable element 44 passes. The bracket 144 is braced by a pair of angle brackets fastend to both the bracket 144 and to the upper channel member 53, one of which angle brackets is shown in FIG. 9 at 145.

As previously noted, during operation the body 39 is moved rapidly to the right and is normally brought to a stop by the action of the moveable member 44, actuator 41, recoil control system 32, and accumulator 102. If the body should not stop before it reaches the bracket 44, it will engage this bracket urging it, the channel 53 and the cutter 142 to the right thereby further machining the rod 136. This metal removal process requires sufficient energy to absorb the maximum momentum of the body 39 without exceeding the allowable stress in any of the structure.

Figure 14:
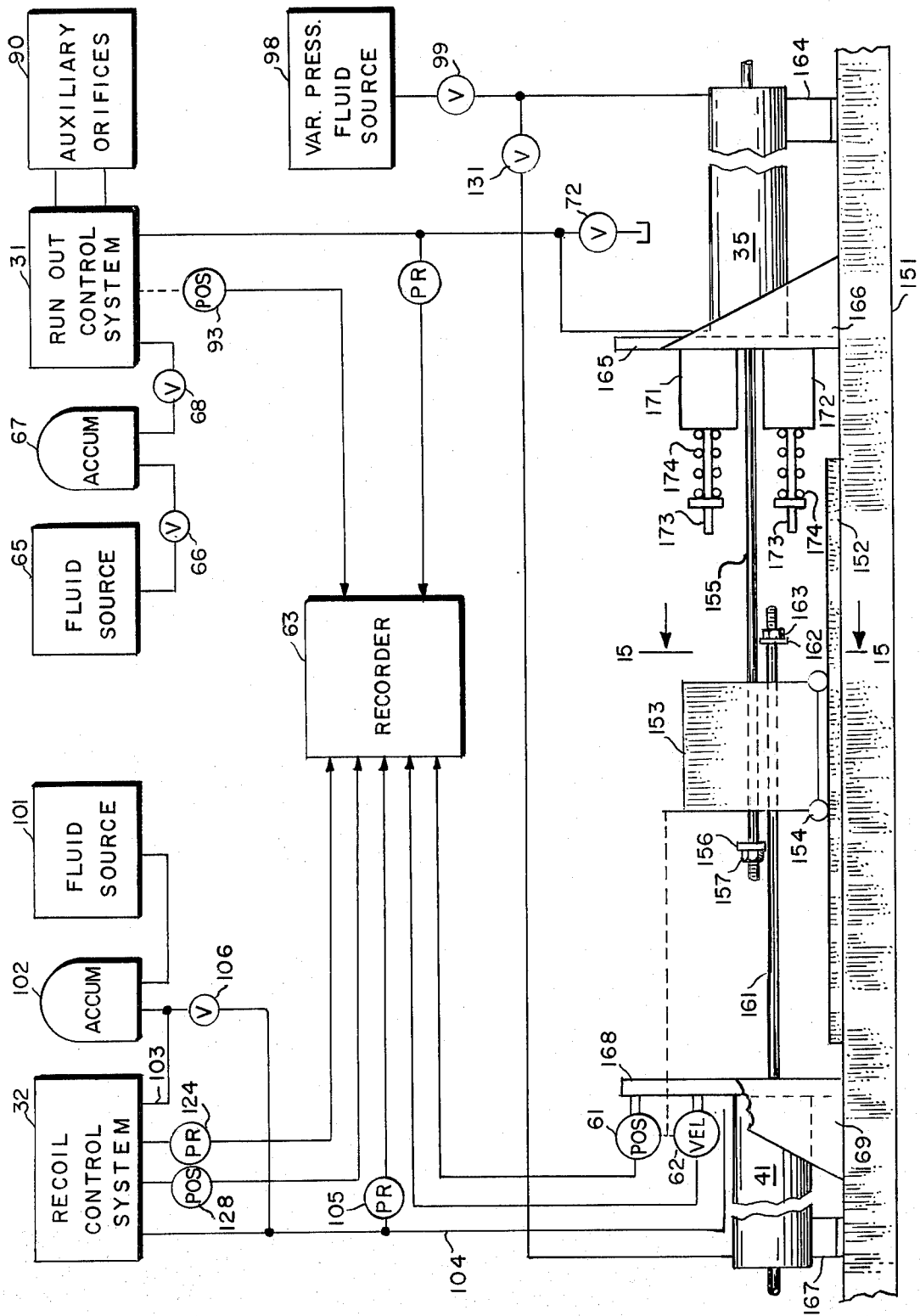
FIG. 14 is a schematic diagram of a modified form of apparatus for practicing the invention.

Referring now to FIG. 14 there is shown a variation of the apparatus of FIG. 9. This variation is preferable to that shown in FIG. 9 in some cases. The principal differences are that the moveable elements of the actuators are stressed in tension rather than in compression and that the cutting-tool-and-rod stopping mechanism has been replaced by a pair of commercially available energy absorbers. In FIG. 14, many of the elements are identical to those in the other figures and have been denoted by the same reference characters.

Referring to FIG. 14 more specifically, there is shown a structural base member 151 on top of which is mounted a pair of tracks 152, one of which is visible in FIG. 14. A body 153, similar to the body 39, is provided with four rollers 154, two of which are visible in FIG. 14 and which rest upon the tracks 152. The actuator 35 is fitted with a moveable element 155 which is longer than the corresponding element 38 of FIG. 9 and which extends through an aperture in the body 153 with a loose fit. The element 155 includes a collar 156, larger than the aperture in the body 153, and a nut 157, both threaded to its end. Similarly, the actuator 41 is provided with a long moveable element 161 which passes through another aperture in the body 153 and which also includes a collar 162 and a nut 163. The actuator 35 is supported by a bracket 164 near its right end and by a plate like upstanding bracket 165 at its left end which bracket is provided with a suitable aperture through which the moveable element 155 passes. The bracket 165 is braced by an angle member 166. Similarly, the actuator 41 is supported by a bracket 167 at its left end and by an upstanding plate like bracket 168 at its right end which bracket is provided with an aperture through which the moveable element 161 passes. The bracket 168 is braced by an angle member 169.

A pair of energy absorbing members 171 and 172 are mounted on the left side of the plate like bracket 165, above the below the moveable element 155 respectively. Each of these includes a plunger 173, a spring 174 and other energy absorbing components (not specifically shown). One model of energy absorbing members which have been found satisfactory can be obtained commercially from Ace Controls Inc., Farmington, Mich. under Model No. 8 AHS 2X8 R38.

Figure 15:
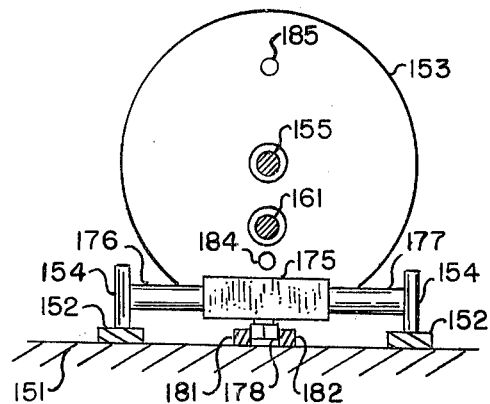
FIG. 15 is a schematic cross section view taken on the line 15 — 15 of FIG. 14.

Referring now to FIG. 15, the body 153 is shown mounted by means of a heavy bar 175 rigidly fastened thereto, for example, by welding. A pair of stub shafts 176 and 177 extend laterally from the bar 175 and support the rollers 154 on either end thereof. A roller 178 is mounted beneath the bar 175 for rotation about a vertical axis and extends between a pair of tracks 181 and 182 fastened to the base member 151. A similar arrangement is provided at the opposite end of the body 153. The position of the moveable members 155 and 161 are shown as are the locations 184 and 185 where the plungers 173 engage the body 153.

Operation of the embodiment of FIGS. 14 and 15 is substantially the same as that heretofore described. To initiate a test, the body 153 is moved all the way to the left close to the bracket 168 with the end of the moveable member 155, that is, the collar 156, in engagement therewith. Initially, the moveable member 161 is in substantially the position shown in FIG. 14. When the runout control system 31 is energized, the body 153 is accelerated to the right as before until the moveable member 155 reaches the position shown in FIG. 1 where it stops. The body 153 becomes disengaged therefrom but continues moving to the right and soon engages the moveable member 161 thereby causing fluid to be expelled from the actuator 41 and passed through the conduit 104 to the recoil control system 32 as before. Should there be a malfunction so that the body 153 is not brought to rest by the recoil control system 32 and associated apparatus, it will engage the plungers 173 at the points 184 and 185 indicated in FIG. 15 and brought to a stop. The energy absorbing members 171 and 172 as described have been found to be adequate for this purpose.

The invention has been described so far as using two separate actuators, one for the runout operation and one for the recoil operation. While this arrangement is preferred at present, it would be possible to have a single actuator perform both functions.

Figure 16:
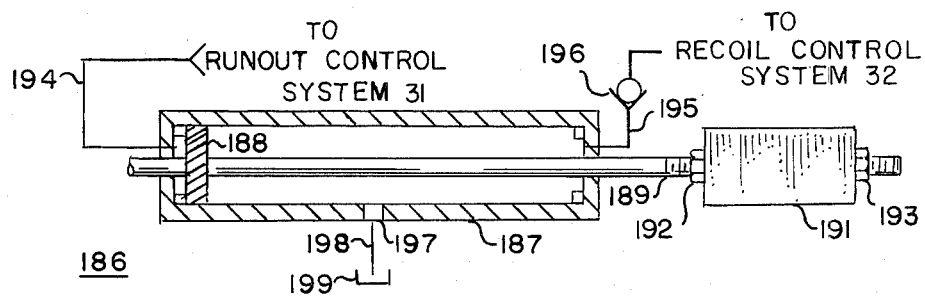
FIG. 16 is a schematic diagram showing a modified form of an actuating mechanism.

Referring now to FIG. 16, there is shown an actuator indicated generally by the reference character 186 and including a hollow cylinder 187 and a piston 188 to which is fastened a piston rod 189 which projects from each end of the cylinder 187. The right end of the piston rod 189 is fastened to a body 191 by any suitable means. As illustrated, there is an aperture extending completely through the body 191 through which the piston rod 189 extends. This rod is held in place by means of nuts 192 and 193 on opposite sides of the body cooperating with threads on the piston rod 189. A conduit 194 communicates with the left end of the cylinder 187 and is hydraulically connected to the runout control system 31. A conduit 195 communicates with the right end of the cylinder 187 and is connected to a check valve 196 which in turn is connected to the recoil control system 32. A port 197 is formed in the cylinder 187 in an intermediate position and is hydraulically connected by means of a conduit 198 to the reservoir or tank 199.

Operation is much the same as that previously described. Fluid from the runout control system 31 enters the left end of the cylinder 187 thereby accelerating the body 191. Fluid to the right of the piston 188 is expelled through the port 197 and the conduit 198 to the tank 199. The high pressure in the accumulator 102 (FIGS. 9 and 14) is prevented from passing into the cylinder 187 by the check valve 196. When the piston 188 reaches the port 197, there is a sudden transition which simulates the firing of the gun. Fluid to the right of the piston 188 can no longer escape through the port 197 and the piston 188 must therefore force fluid out of the cylinder 187 and through the conduit 195 and check valve 196 to the recoil control system as before. At the same time, the runout control system becomes ineffective because the piston 188, having passed the port 197, permits communication between the conduit 194 and the tank 199.

CONCLUSION

From the above it is apparent that applicant has provided a novel method and apparatus for testing the runout and recoil control systems of a gun without the necessity of incurring the risks and costs attendant to actually firing the gun. The position transducers 93 and 128 and the pressure transducer 124, while not essential to the basic concept of the invention, have been found useful in connection with the particular runout control system and recoil control system described in the aforementioned co-pending application Ser. No. 765,706. However, it will be apparent that the invention is equally applicable to other runout and recoil control systems. Additionally, it will be understood that the "fluid" mentioned throughout the specification may be either a liquid or a gas. It is preferred at present that the sources 65 and 101 be sources of a liquid under pressure. The source 98 may be a source of either a liquid or a gas under pressure and in one embodiment nitrogen was used successfully.

Although the invention has been described in considerable detail for illustrative purposes, it will be apparent that many modifications can be made in the apparatus illustrated and in the method described. Accordingly, it is desired that the protection afforded by Letters Patent be limited only by the true scope of the appended claims.

What is claimed is:

1. The method of testing the runout and recoil control systems for a gun comprising the steps of accelerating a body having a mass representative of the mass of the moving parts of the gun to a predetermined velocity, decelerating the body under control of the recoil control system under test and measuring and recording the position of the body as a function of time.

2. The method of claim 1 in which the velocity of the body is also measured and recorded as a function of time.

3. The method of claim 1 in which the step of accelerating the body is performed under the control of the runout control system under test.

4. The method of claim 3 in which the step of accelerating the body includes the steps of placing the body in engagement with the moveable element of a cylinder and piston actuator and passing fluid under pressure through the runout control system under test to the cylinder of the actuator whereby the body is accelerated.

5. The method of claim 4 in which the fluid passed to the system under test is obtained from an accumulator.

6. The method of claim 4 in which the pressure within the cylinder is also measured and recorded as a function of time.

7. The method of claim 1 in which the step of decelerating the body includes the steps of engaging the body while at said predetermined velocity with the moveable element of a cylinder and piston actuator whereby motion of that element causes fluid to be expelled from the cylinder and passing the fluid so expelled to the recoil control system under test.

8. The method of claim 7 in which the fluid expelled from the cylinder is passed through the recoil control system under test to an accumulator.

9. The method of claim 7 in which the pressure within the cylinder is also measured and recorded as a function of time.

10. The method of claim 7 in which the step of accelerating the body is performed under the control of the runout control system under test.

11. The method of claim 10 in which the step of accelerating the body includes the steps of placing the body in engagement with the moveable element of a cylinder and piston actuator and passing fluid under pressure through the runout control system under test to the cylinder of the last named actuator whereby the body is accelerated.

12. Apparatus for testing the runout and recoil control systems for a gun comprising a body having a mass representative of the mass of the moving parts of the gun, means for accelerating said body to a predetermined velocity, means for decelerating said body under control of the recoil control system under test, and means for measuring and recording the position of said body as a function of time.

13. Apparatus in accordance with claim 12 including means for measuring and recording the velocity of said body as a function of time.

14. Apparatus in accordance with claim 12 in which said means for accelerating is adapted to be controlled by the runout control system under test.

15. Apparatus in accordance with claim 14 in which said means for accelerating includes a cylinder and piston actuator including a moveable element, said actuator being positioned with said moveable element in engagement with said body, and means adapted for passing fluid under pressure through the runout control system under test to said cylinder of said actuator whereby said body is accelerated.

16. Apparatus in accordance with claim 15 in which said means adapted for passing fluid includes an accumulator adapted to furnish fluid to the runout control system under test.

17. Apparatus in accordance with claim 15 including means for measuring and recording the pressure within said cylinder as a function of time.

18. Apparatus in accordance with claim 15 in which the runout control system under test includes a flow control valve having a moveable spool and in which the apparatus for testing includes means for measuring and recording the position of the spool as a function of time.

19. Apparatus in accordance with claim 15 including means for applying a biasing force opposing the force of the fluid from the runout control system under test, said biasing force being representative of the force of gravity acting on the moving parts of the gun when elevated above the horizontal.

20. Apparatus according to claim 19 in which said means for applying comprises a variable pressure fluid source connected to said actuator so as to oppose the force of the fluid from the runout control system under test.

21. Apparatus in accordance with claim 12 in which said means for decelerating includes a cylinder and piston actuator including moveable element, said actuator being positioned so that said moveable element is engaged by said body while at said predetermined velocity, whereby motion of said element causes fluid to be expelled from said cylinder, and means adapted for passing the fluid so expelled to the recoil control system under test.

22. Apparatus in accordance with claim 21 including an accumulator adapted to receive the fluid so expelled after passage through the recoil control system under test.

23. Apparatus in accordance with claim 21 including means for measuring and recording the pressure within said cylinder as a function of time.

24. Apparatus in accordance with claim 21 in which the recoil control system under test includes a valve having a valve spool which is positioned in response to a control fluid at a pilot pressure applied thereto and in which the apparatus for testing includes means for measuring and recording as a function of time the pressure of the control fluid and the position of the valve spool.

25. Apparatus in accordance with claim 21 in which said means for accelerating is adapted to be controlled by the runout control system under test.

26. Apparatus in accordance with claim 25 in which said means for accelerating includes a cylinder and piston actuator including a moveable element, said last named actuator being positioned with said moveable element in engagement with said body, and means adapted for passing fluid under pressure through the runout control system under test to said cylinder of said last named actuator whereby said body is accelerated.

* * * * *